United States Patent
Alaimo et al.

(10) Patent No.: US 12,018,832 B2
(45) Date of Patent: Jun. 25, 2024

(54) LIGHT SOURCE MODULE WITH ADAPTIVE ILLUMINATION

(71) Applicant: Apple Inc., Cupertino, CA (US)

(72) Inventors: Angelo M. Alaimo, San Jose, CA (US); Blake M. Coughenour, Sunnyvale, CA (US); Bryan Dang, San Jose, CA (US); Florian R. Fournier, Cupertino, CA (US); Katherine J. Armstrong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/851,294

(22) Filed: Jun. 28, 2022

(65) Prior Publication Data

US 2023/0086557 A1    Mar. 23, 2023

Related U.S. Application Data

(60) Provisional application No. 63/247,702, filed on Sep. 23, 2021.

(51) Int. Cl.
| | |
|---|---|
| *F21V 5/02* | (2006.01) |
| *F21V 5/00* | (2018.01) |
| *G02B 3/08* | (2006.01) |
| *G03B 21/62* | (2014.01) |

(52) U.S. Cl.
CPC ............... *F21V 5/02* (2013.01); *F21V 5/007* (2013.01); *G02B 3/08* (2013.01); *G03B 21/62* (2013.01)

(58) Field of Classification Search
CPC .. F21V 5/02; F21V 5/007; G02B 3/08; G02B 3/04
See application file for complete search history.

(56) References Cited

U.S. PATENT DOCUMENTS

| | | | |
|---|---|---|---|
| 7,452,087 B2 | 11/2008 | Imade | |
| 7,637,639 B2 | 12/2009 | Epstein | |
| 8,564,004 B2 | 10/2013 | Tarsa et al. | |
| 8,761,594 B1 | 6/2014 | Gross et al. | |
| (Continued) | | | |

FOREIGN PATENT DOCUMENTS

| | | |
|---|---|---|
| CN | 207006046 | 2/2018 |
| CN | 108253339 | 7/2018 |
| (Continued) | | |

OTHER PUBLICATIONS

U.S. Appl. No. 17/903,810, filed Sep. 6, 2022, Remez et al.

*Primary Examiner* — Fatima N Farokhrooz
(74) *Attorney, Agent, or Firm* — Brownstein Hyatt Farber Schreck, LLP

(57) ABSTRACT

Various embodiments disclosed herein include adaptive light source modules that can provide adaptive illumination to a scene. The adaptive light source modules may comprise a housing, an emitter array, and a lens. The emitter array comprises a plurality of emitters. The lens may redirect light emitted from the emitter array through a transparent window of the housing. The housing may further include a prismatic surface that distorts light emitted from the emitter array and/or one or more non-transparent portions that limits light travelling therethrough. The adaptive light source module may optionally comprise a light sensor, and a portion of the lens may be configured to direct light toward the light sensor.

13 Claims, 13 Drawing Sheets

(56) References Cited

U.S. PATENT DOCUMENTS

| | | | |
|---|---|---|---|
| 8,786,207 B2 | 7/2014 | Huang et al. | |
| 9,046,634 B2 | 6/2015 | Shchekin et al. | |
| 9,109,781 B2 | 8/2015 | Holder | |
| 9,798,070 B2 | 10/2017 | Van Bommel et al. | |
| 9,946,055 B2 | 4/2018 | Krijn et al. | |
| 10,009,527 B2 | 6/2018 | Jagt et al. | |
| 10,222,540 B2 | 3/2019 | Hikmet et al. | |
| 10,420,177 B2 | 9/2019 | Stopa et al. | |
| 10,423,050 B2 | 9/2019 | Yoshida | |
| 10,690,986 B2 | 6/2020 | Firka et al. | |
| 10,871,268 B2 | 12/2020 | Jagt et al. | |
| 11,013,079 B2 | 5/2021 | Jurik et al. | |
| 11,022,297 B2 | 6/2021 | Shum | |
| 11,435,044 B2 | 9/2022 | Owoc et al. | |
| 2004/0091255 A1 | 5/2004 | Chase et al. | |
| 2008/0123350 A1* | 5/2008 | Choe | G02F 1/133606 362/330 |
| 2015/0009677 A1* | 1/2015 | Catalano | F21S 10/00 362/296.07 |
| 2017/0059120 A1* | 3/2017 | Kataoka | H01L 33/62 |

FOREIGN PATENT DOCUMENTS

| | | | | |
|---|---|---|---|---|
| CN | 209592076 | | 11/2019 | |
| CN | 105785691 | | 9/2020 | |
| CN | 112466859 A | * | 3/2021 | ............ F21S 10/06 |
| DE | 102009047788 | | 3/2011 | |
| DE | 102010014289 | | 10/2011 | |
| DE | 102016111600 | | 12/2016 | |
| DE | 102017112112 | | 12/2018 | |
| JP | S63168902 A | * | 7/1988 | |
| JP | 2004252469 | | 9/2004 | |
| JP | 2005215634 | | 8/2005 | |
| WO | WO 06/010790 | | 2/2006 | |
| WO | WO 15/197832 | | 12/2015 | |
| WO | WO 18/185218 | | 10/2018 | |
| WO | WO-2021084919 A1 | * | 5/2021 | ............ F21V 5/008 |

* cited by examiner

LIGHT SOURCE MODULE WITH ADAPTIVE ILLUMINATION

CROSS-REFERENCE TO RELATED APPLICATIONS

This application claims the benefit under 35 U.S.C. § 119(e) of U.S. Provisional Patent Application No. 63/247,702, filed Sep. 23, 2021, the contents of which are incorporated herein by reference in their entirety.

FIELD

The described embodiments relate generally to light source modules that include an array of light emitters configured to provide adaptive illumination to a scene.

BACKGROUND

Cameras continue to be an important feature of consumer electronics devices such as smartphones, tablets, and computers. The imaging capabilities of these consumer electronics devices have steadily increased as individual cameras have improved in quality and devices have started integrating multiple-camera ("multi-camera") systems and depth sensors, allowing users to capture high quality images in an ever-increasing range of situations. In low light conditions, a light source module (also known as a "flash") may be used to illuminate a scene to facilitate image capture. Different scene conditions may benefit from different flash illumination across the scene (which may further vary depending on which camera of a multi-camera system is doing the imaging), and thus it may be desirable to provide a flash module with the flexibility to selectively provide illumination to different portions of a scene.

SUMMARY

Described herein are light source modules for adaptively illuminating a scene. In some variations, a light source module comprises a housing comprising a transparent window, an emitter array positioned and configured to emit light through the transparent window, and a lens, wherein the lens is positioned between the transparent window and the emitter array and comprises an imaging region positioned over the emitter array. In some of these variations, the transparent window comprises a prismatic surface having a plurality of concentric prisms positioned around a center point, wherein each concentric prism of the plurality of concentric prisms has an inner face that is angled toward the center point at a first angle and an outer face that is angled away from the center point at a second angle. The first angle and second angle for each concentric prism of the plurality of concentric prisms may each be less than 16 degrees, and in some instances the first angle and second angle for each concentric prism of the plurality of concentric prisms are each between 5 and 12 degrees.

In some instances, the housing comprises a substrate and a cap, wherein the light emitter array is supported by the substrate. In some of these variations, an attachment region of the lens is configured and positioned within the housing such that the cap contacts a top surface of the attachment region and the substrate contacts a bottom surface of the attachment region. In other variations, the lens comprises an attachment region connected to a portion of the housing and an intermediate region between the imaging region and the attachment region. In some of these variations the intermediate region is shaped as an annular body having an inner sidewall, and the inner sidewall encircles at least a portion of the imaging region. In others of these variations the light source module further comprises a light sensor, where at least a portion of the intermediate region is positioned above the light sensor. In some of these instances a rear surface of the intermediate region is closer to substrate than a top surface of the emitter array.

Other examples are directed to a system comprising a light source module. The light source module comprises a housing comprising a transparent window, an emitter array positioned and configured to emit light through the transparent window, and a lens. In some instances the lens is positioned between the transparent window and the emitter array, and at least one central emitter of the emitter array is larger than at least one peripheral emitter of the emitter array. In some variations the system further comprises a first camera having a first field of view, and the light source module is configured such that light generated by the at least one central emitter fills the first field of view. In some of these variations, the at least one central emitter comprises a first central emitter, and the light source module is further configured such that light emitted by the first central emitter fills the first field of view. In others of these variations, the at least one central emitter comprises a plurality of central emitters, and the light source module is further configured such that light collectively emitted by the plurality of central emitters fills the first field of view. In still other variations, the at least one central emitter comprises a plurality of central emitters and the at least one peripheral emitter comprises a plurality of peripheral emitters that surround the plurality of central emitters.

Still other examples of the present invention include a method of illuminating a scene during an image capture comprising determining a target field of view of the scene, determining an illumination profile based at least in part on the determined target field of view, illuminating the scene according to the determined illumination profile using an adaptive light source module; and capturing an image of the determined target field of view while illuminating the scene. The adaptive light source module comprises an emitter array having a plurality of emitters, such that illuminating the scene comprises generating light with a first subset of the plurality of emitters when the determined target field of view is a first field of view and further comprises generating light with all of the plurality of emitters when the determined target field of view is a second field of view. In some instances the first subset of the plurality of emitters comprises a first emitter, and generating light with the first emitter fills the first field of view. In some of these variations, generating light with all of the plurality of emitters fills the second field of view. In some instances the second field of view is larger than the first field of view. The first field of view may correspond to a field of view of a first camera and the second field of view may correspond to a field of view of a second camera.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
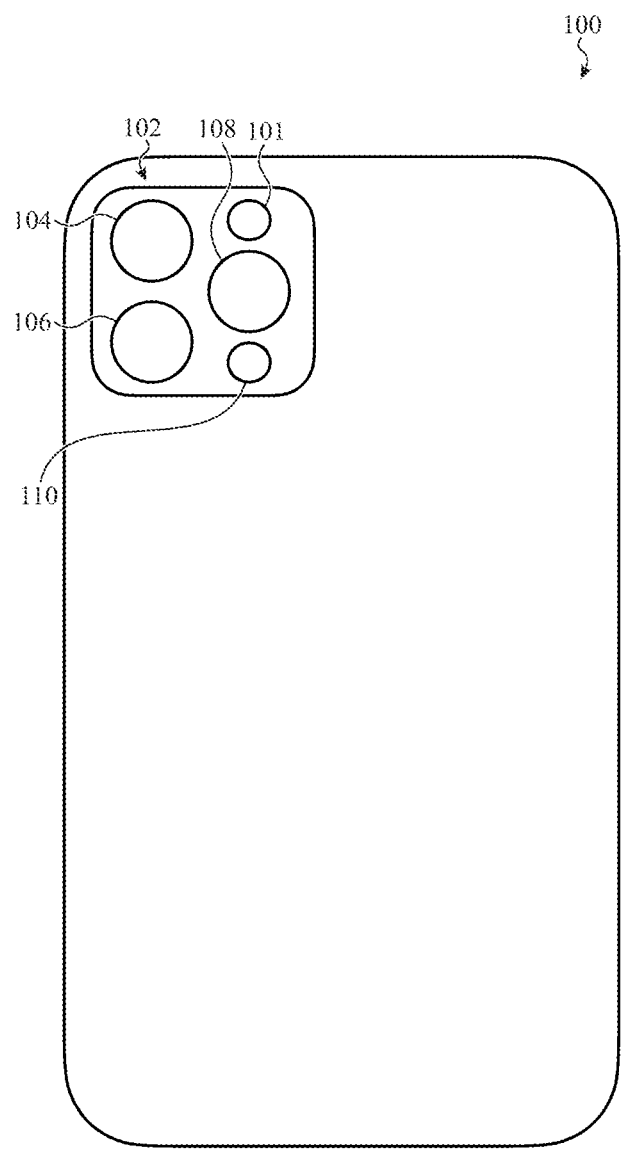
FIG. 1A shows a rear view of an illustrative example of a device comprising an adaptive light source module as described here.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "rear", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. That said, when discussing the adaptive light source modules described here, this application will use the terms "top" and "front" to refer to the side of the adaptive light source module that emits light to a scene or to refer to portions of individual module components that face the light-emitting side of the adaptive light source module. Similarly, the terms "back" and "rear" may refer to a side of the adaptive light source module opposite the light-emitting side, as well as to portions of individual module components that face away from the light-emitting side of the adaptive light source module. The directional terminology used to describe the adaptive light source module need not extend to any device incorporating the adaptive light source module or other components thereof (e.g., a "front" side of the adaptive light source module need not face the same direction as a "front" side of the overall device).

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to adaptive light source modules and methods of using the same to adaptively provide illumination to a scene. These adaptive light source modules generally comprise an array of emitters (such as LEDs), each of which are configured to emit light. The amount of light emitted by individual emitters (or groups of emitters) may be separately controlled, thereby allowing the light source module to locally control the intensity of light delivered to the scene by the adaptive light source module. The adaptive light source modules may be used to emit light during image capture using one or more cameras to facilitate flash photography, while in other instances may be used continuously to emit light as part of a flashlight mode. These and other embodiments are discussed below with reference to FIGS. 1A-8B. However, those skilled in the art will readily appreciate that the detailed description given herein with respect to these Figures is for explanatory purposes only and should not be construed as limiting.

The adaptive light source modules described herein may be used in any suitable portable electronic device that preferably includes one or more cameras. FIG. 1A shows a rear view of a device 100 suitable for use with the various embodiments of the adaptive light source modules described here. As shown there, the device 100 comprises an adaptive light source module 101 and a multi-camera system 102. While discussed herein as being used with a multi-camera system 102, it should be appreciated that the adaptive light source modules described herein may be used to illuminate some or all of the field of view of a single camera. Additionally, while shown as placed on the rear of a device 100, it should be appreciated that an adaptive light source module may be additionally or alternatively placed on the front of the device (e.g., a front side having a display) or any other side as desired.

In general, when device 100 includes a multi-camera system 102, the multi-camera system 102 comprises a first camera 104 and a second camera 106. The multi-camera system 102 may optionally include one or more additional cameras, such as a third camera 108 as shown in FIG. 1A. The multi-camera system 102 may further comprise one or more depth sensors (e.g., depth sensor 110 as shown in FIG. 1A), such as will be described in more detail below.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
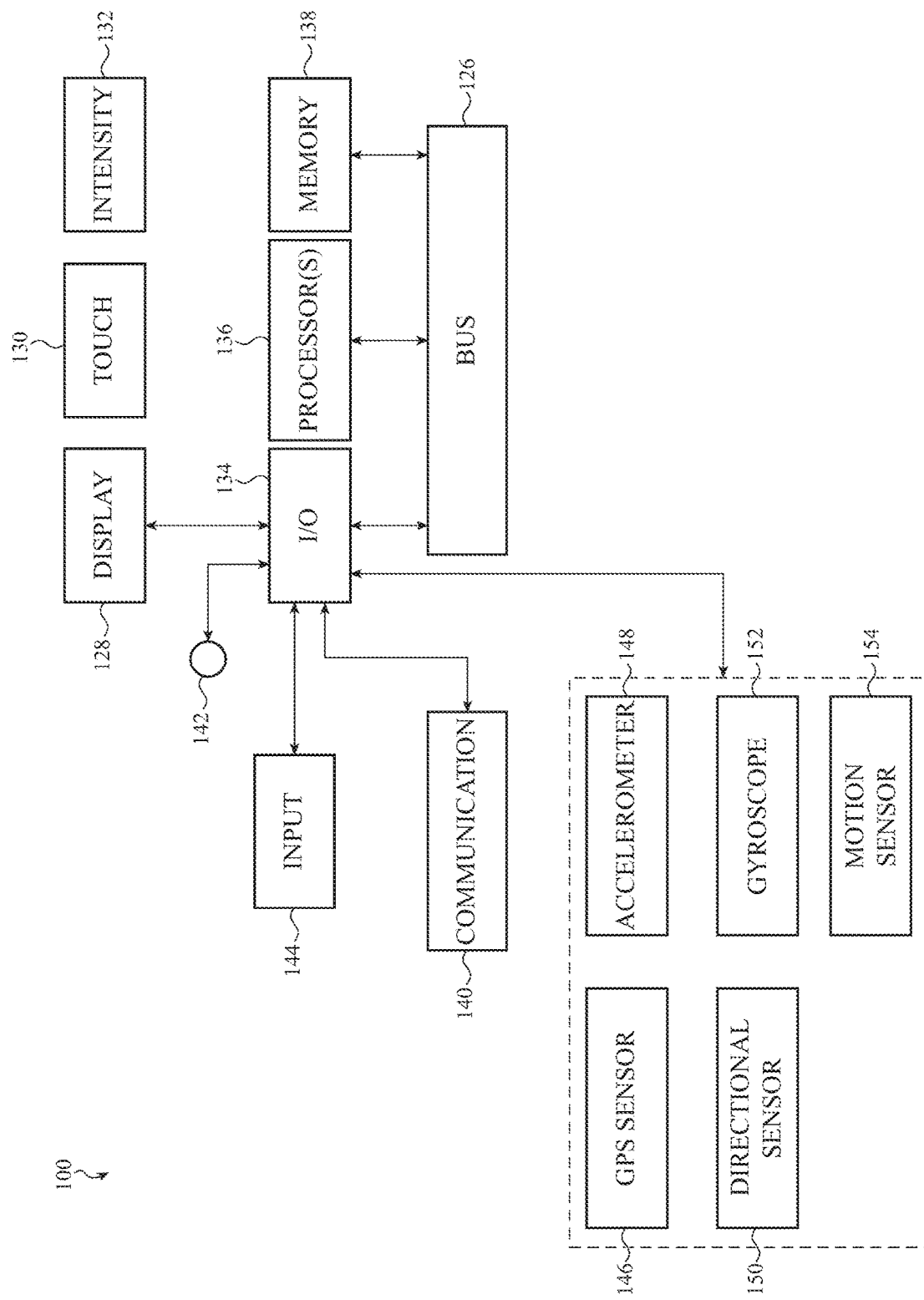
FIG. 1B depicts exemplary components of the device of FIG. 1A.

FIG. 1B depicts exemplary components of device 100. In some embodiments, device 100 has bus 126 that operatively couples I/O section 134 with one or more computer processors 136 and memory 138. I/O section 134 can be connected to a display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134.

Memory 138 of device 100 can include one or more non-transitory computer-readable storage mediums, for storing computer-executable instructions, which, when executed by one or more computer processors 136, for example, can cause the computer processors to perform the techniques that are described here. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images a scene and adaptively illuminating the scene as described herein. Device 100 is not limited to the components and configuration of FIG. 1B, but can include other or additional components in multiple configurations.

Returning to FIG. 1A, the cameras within a multi-camera system 102 have fields of view that at least partially overlap with each other. In other words, the device 100 may include an additional camera or cameras (not shown) that are not considered part of the multi-camera system 102 if the field(s) of view for the additional camera(s) do not at least partially overlap the field of view of at least one camera within the multi-camera system 102. For example, device 100 may comprise a front-facing camera (not shown) that faces in an opposite direction of the first camera 104 and the second camera 106 (as well as any other cameras of the multi-camera system 102), and thus would not be considered part of the multi-camera system 102.

Similarly, a depth sensor 110 may be considered part of a multi-camera system 102 if it is positioned and arranged within device 100 such that the depth sensor 110 is able to obtain depth information at one or more points within a field of view of one or more of the cameras of the multi-camera system 102. The device 100 may comprise one or more depth sensors (e.g., a depth sensor on a front of the device that faces in an opposite direction of the cameras of the multi-camera system 102, and thus are not considered part of the multi-camera system 102. It should be appreciated that a device may include more than one multi-camera systems (e.g., a first multi-camera system on one side of the device and a second multi-camera system on a second side of the device), each of which may optionally comprise a respective depth sensor, and some or all of the multi-camera systems may include an adaptive light source module as discussed here.

Figure 1C:
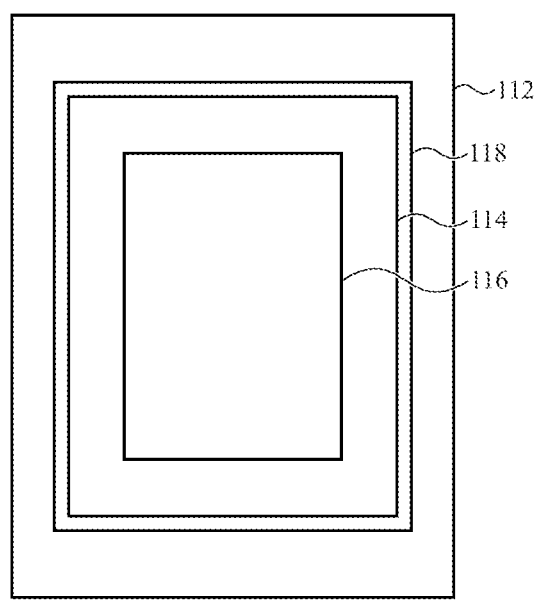
FIG. 1C shows a representation of the fields of views of cameras of a multi-camera system that may be used with the device of FIG. 1A.

The cameras of the multi-camera system 102 may have different focal lengths, which may result in the cameras having different field of view sizes. For example, FIG. 1C shows example field of views for the cameras of the multi-camera system 102 depicted in FIG. 1A. The first camera 104 may have a first field of view 112, the second camera may have a second field of view 114, and the third camera 108 may have a third field of view 116. As shown there, the field of view 112 of the first camera 104 may have a wider (i.e., larger) field of view than both the field of view 114 of the second camera 106 and the field of view 116 of the third camera 108. Preferably the first field of view 112 fully encompasses both the second field of view 114 and the third field of view 116 (i.e., so that there is no portion of the second field of view 114 or the third field of view 116 that is not also part of the first field of view 112), but need not.

Similarly, the field of view 114 of the second camera 106 may fully encompass the field of view 116 of the third camera 108. While the first field of view 112, second field of view 114, and third field of view 116 as depicted in FIG. 1C assume a fixed focal length for each of the first camera 104, second camera 106, and third camera 108, it should be appreciated that in some instances, one or more of the cameras of the multi-camera system may include some level of optical zooming capabilities (which may result in a field of view that varies in size based on the zoom level). For the purpose of this application, the arrangement of field of views depicted in FIG. 1C may be assumed to be the widest possible field of view for each camera.

Also shown in FIG. 1C is a field of coverage 118 for depth sensor 110, which encompasses the area in a scene across which the depth sensor 110 may calculate depth information for the scene. It should be appreciated that depending on the design of the depth sensor 110 (as will be discussed in more detail below), the depth sensor 110 may not calculate depth values for every point within the field of coverage 118. Instead, the field of coverage 118 is intended to reflect the widest lateral extent to which the depth sensor is capable of providing depth information. For the purpose of this application, the field of coverage 118 is represented by a rectangle, where depth sensor 110 is capable of providing depth information for at least one point on each side of the rectangle.

As mentioned above, the field of coverage 118 for depth sensor 110 at least partially overlaps some or all of fields of view of the cameras of the multi-camera system 102. In some variations, it may be desirable to have the field of coverage 118 fully encompass the fields of view for one or more cameras. For example, in the example shown in FIG. 1C, the field of coverage 118 of depth sensor 110 may fully encompass the field of view 114 of the second camera 106 (as well as the field of view 116 of the third camera 108), while not fully encompassing the field of view 112 of the first camera 104. In other variations, the field of coverage 118 may fully encompass the fields of view of all of the cameras in the multi-camera system 102 (which, in the variation of device 100 shown in FIG. 1A would include the fields of view of each of the first camera 104, second camera 106, and third camera 108). In still other variations, the field of coverage 118 may fully encompass a single camera field of view (e.g., the field of view 116 of the third camera 108 in the variation of the multi-camera system 102 shown in FIG. 1C) while not fully encompassing the remaining camera fields of view.

When device 100 includes a depth sensor 110 associated with a camera or multi-camera system 102, distance information measured by the depth sensor 110 may be used to assist in one or more imaging operations. For example, the depth sensor 110 may be able to provide information about the relative positioning of different objects within a given scene. This information may help in autofocus operations for a camera, or may be used to help determine the illumination profile the adaptive light source module will use to illuminate a given scene. In other words, the depth information may be used as an input in determining the parameters that will be used to control an emitter array (e.g., to select the currents applied to individual emitters or groups of emitters of the emitter array) of the adaptive light source modules described here. For example, in some instances a given emitter of an array may be driven to produce less light to illuminate a target object that is relatively closer to the device 100 than it would illuminate a target object that is further from the device 100.

The depth sensor 110 may be any suitable system that is capable of calculating the distance between the depth sensor 110 and various points in the scene. The depth sensor 110 may generate a depth map including these calculated distances, which may be used by other systems in the device 100 such as mentioned above. The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate the entire field of coverage 118 at one time, or may only illuminate a subset of the field of coverage 118 at a given time (e.g., via one or more spots, stripes, or other patterns that may either be fixed or may be scanned across the field of coverage 118).

Returning to FIG. 1A, the device may comprise an adaptive light source module 101. The adaptive light source module 101 may be part of the multi-camera system 102. The adaptive light source module 101 may be considered to part of a multi-camera system if the adaptive light source module 101 if its field of illumination (the widest lateral extent in a scene to which the adaptive light source module is capable of illuminating) at least partially overlaps the field of view of at least one camera of the multi-camera system 102. Similarly, the adaptive light source module 101 may be considered to be associated with an individual camera if the field of illumination of the adaptive light source module 101 at least partially overlaps the field of view of that camera.

Figure 2:
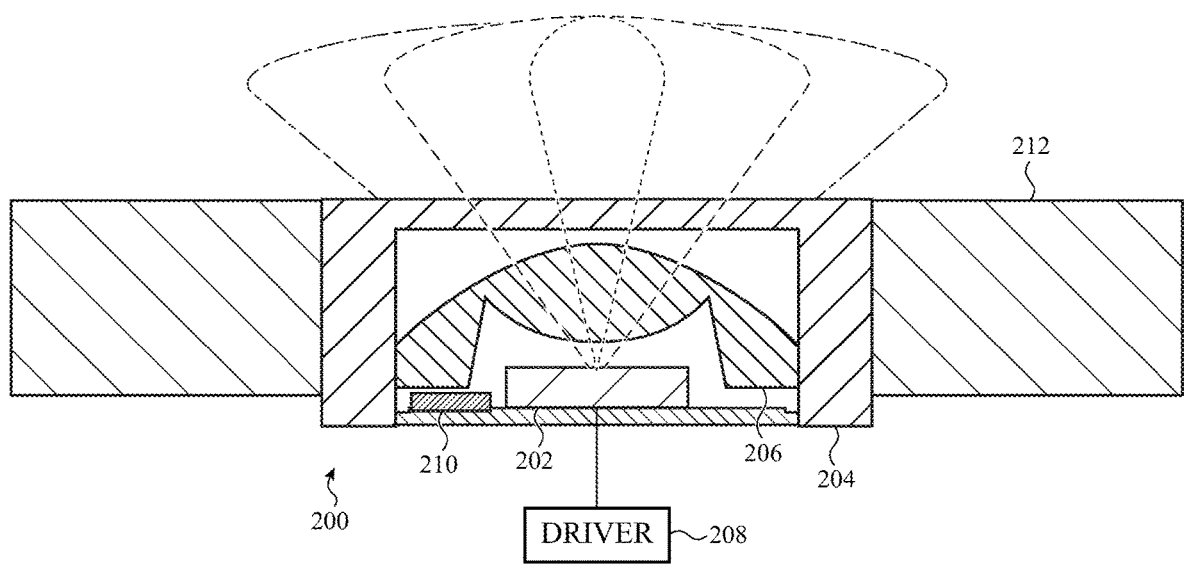
FIG. 2 shows a cross-sectional side view of an illustrative example of an adaptive light source module as described here.

FIG. 2 shows a cross-sectional side view of an illustrative example of an adaptive light source module 200 suitable for use with the various embodiments described below with respect to FIGS. 3-8B. As shown there, the adaptive light source module 200 may comprise an emitter array 202, a housing 204, and a lens 206. The adaptive light source may be integrated at least partially within a device, and may be connected to a portion the housing 212 of the device (such as device 100 described above with respect to FIGS. 1A-1C above). The emitter array 202 may comprise a plurality of individual emitters 202 each capable of emitting light, and the adaptive light source module 200 may further comprise a driver 208 configured to selectively drive emitters (and/or groups of emitters) to generate light. This light may exit a front surface of the adaptive light source module 200 to illuminate a scene. For example, the illumination may be adaptive to changing scene content (e.g., different objects in the scene will result in different illumination profiles). In other instances, the illumination may be adaptive to changing zoom level, such as will be described in more detail below. The emitter array 202 may preferably be an array of light emitting diodes (LED), but it should be appreciated that the emitter array 202 may comprise any emitters capable of generating light (e.g, semiconductor lasers or the like). Additionally, the emitters of the emitter array 202 may be grown on a single common substrate, or may be formed separately and then mounted on a substrate to form the emitter array 202.

The lens 206 may be positioned between the adaptive light source module 200 and the housing 204, and may focus, collimate, or otherwise shape light emitted by the emitter array 202. The size and shape of the emitters of the emitter array 202, the design of the lens 206, and the relative positioning between the emitter array 202 and the lens 206 may all impact the size, shape, and position of the field of illumination of the adaptive light source module 200 (as well as the respective portion of the field of illumination that is illuminated by each emitter of the emitter array 202). In some instances, the design of the housing (e.g., the optical properties of a transparent window of the housing) may also impact the size, shape, and position of the field of illumination of the adaptive light source module 200. Accordingly, the design of these components may be specifically tailored to achieve a particular field of illumination, such as will be described in more detail below.

The housing 204 is generally configured to enclose the components of the adaptive light source module 200 and may facilitate mounting of the adaptive light source module 200 relative to the rest of the device. In some instances, a front side of the housing 204 may be configured to alter light passing therethrough, which may impact the light emitted by the adaptive light source module 200. An example of this is described below with respect to FIGS. 4A-4C. In some embodiments, the adaptive light source module 200 may additionally comprise an optional sensor 210. Sensor 210 may preferably be a light sensor, which may be capable of measuring one or more aspects of ambient light (e.g., brightness, color temperature, flicker information, combinations thereof, and the like) received from the scene. Additionally or alternatively, a light sensor may be used to receive a portion of the light emitted by the emitter array 202 (e.g., light that may be reflected off a portion of the lens 204) which may be used to monitor the performance of the emitter array 202.

Figure 3:
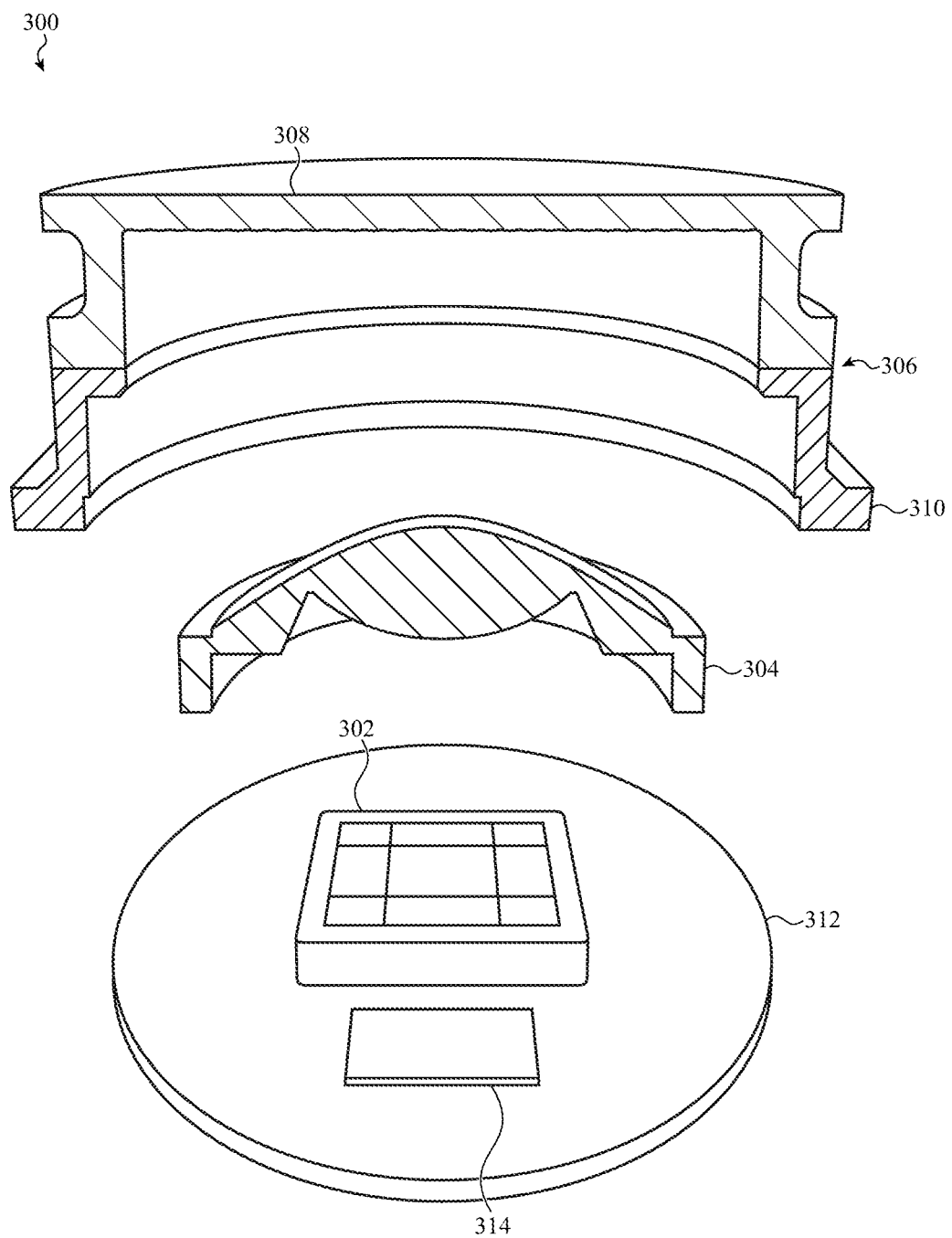
FIG. 3 shows an exploded perspective view of a variation of an adaptive light source module having a housing comprising a cap and a substrate.

In some variations, the housing of the adaptive light source module 300 may be configured to help position the lens relative to the emitter array. For example, FIG. 3 shows an exploded perspective view of one such variation of an adaptive light source module 300. As shown there, the adaptive light source module 300 may comprise an emitter array 302, a lens 304, and a housing comprising a cap 306 and a substrate 312. The substrate 312 may support the emitter array 302 and, in embodiments where the adaptive light source module 300 comprises a sensor (such as sensor 314 shown there, which may be configured in any manner as described above), may further support the sensor 314. The substrate 312 may be configured to provide electrical connections to the emitter array 302 and sensor 314, and may route signals (e.g., power, control, or the like that may be generated by a driver (not shown)) to or from the emitter array 302 and sensor 314. In some instances, the substrate 312 is a printed circuit board.

In some variations, the adaptive light source module 300 is configured such that, when assembled, a portion of the lens 304 is sandwiched between the cap 306 and the substrate 312. In these variations, a portion of the cap 306 is positioned to contact a top surface of the lens 304 (either directly or indirectly via one or more intervening components such as a spacer), while a portion of the substrate 312 is positioned to contact a bottom surface of the lens 304 (either directly or indirectly via one or more intervening components such as a spacer). The cap 306 and substrate 312 may be fixed relative to each other such that the cap 306 and substrate 312 prevent movement of the lens 304 along a direction (e.g., a direction perpendicular to a light-emitting surface of the emitter array). In some of these variations, the cap 306 may comprise a transparent window 308 through which light from the emitter array 302 may be conveyed to the scene, and a non-transparent portion 310, which may obscure a portion of the lens 304 as will be described in more detail below.

The transparent window 308 (or portions thereof) may optionally act as a lens or prism, which may refract light passing therethrough. For example, in some variations of the adaptive light source modules described here, a window of the adaptive light source module may be configured to remove image artifacts that may result from the space between adjacent emitters of the emitter array. FIG. 4 shows a cross-sectional side view of one such variation of a housing 400 suitable for use with the adaptive light source modules described here. As shown there, the housing 400 may comprise a prismatic surface 402, which may include a plurality of concentric prisms (e.g., prism 406 shown in FIG. 4) positioned around a center point (which may or may not be aligned with a center of the housing 400). Each prism may extend from a surface of the housing and have an inner face (e.g., inner face 408 of prism 406) that is angled toward the center point (e.g., at a first angle $\alpha$) and an outer face (e.g., outer face 410 of prism 406) that is angled away from the center point (e.g., at a second angle $\beta$). The prisms may collectively remove artifacts caused by gaps between adjacent emitters of the emitter array, as will be described in more detail below.

As shown in FIG. 4, the prisms of the prismatic surface 402 may preferably be symmetric (i.e., such that the first angle $\alpha$ is the same as the second angle $\beta$), but it should be appreciated that one or more of the prisms may be asymmetric such that the first angle $\alpha$ of a given prism is different than (e.g., greater than or less than) the second angle $\beta$. Additionally or alternatively, the angle $\alpha$ of the inner face or the angle $\beta$ of the outer face of a prism may vary radially, such that these angles measured for the prism at one cross-section of the prismatic surface 402 may be different than these angles measured for the same prism at a different cross-section of the prismatic surface 402. Additionally or alternatively, different prisms of the prismatic surface 402 may have different prism angles (e.g., the angle of the inner face of a first prism may be different than a corresponding angle of the inner face of a second prism and/or the angle of the outer face of the first prism may be the different than a corresponding angle of the outer face of the second prism). Collectively, the prisms control the distortion applied to incoming light received from the emitter array, and thus angles of the prisms of the prismatic surface 402 may be locally selected to achieve a desired distortion profile.

Figure 4A:
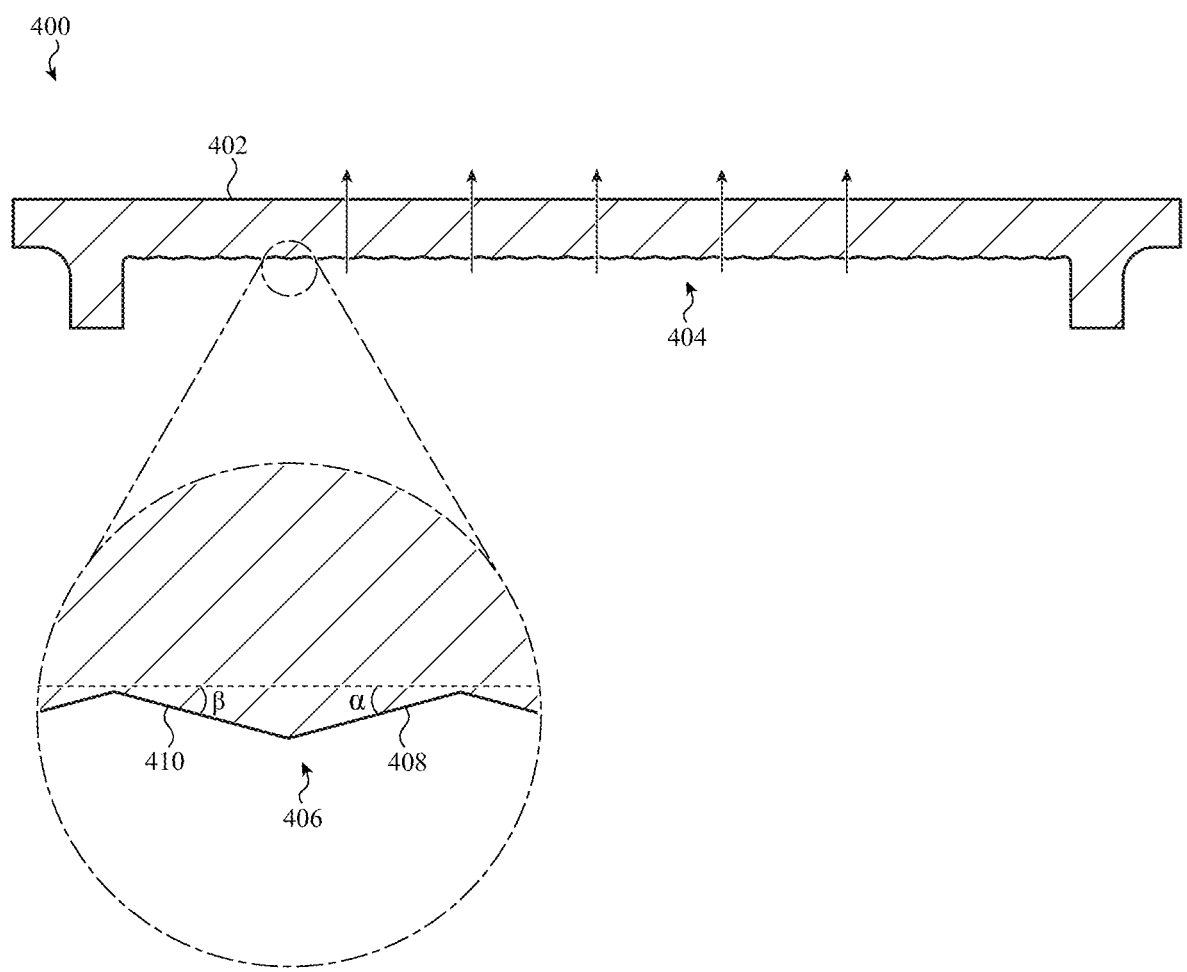
FIG. 4A shows a cross-sectional side view of a variation of a housing suitable for use with the adaptive light source modules described herein and comprising a prismatic surface.
Figure 4B:
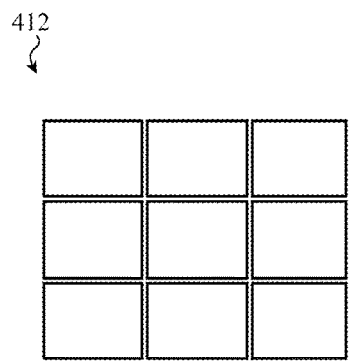
FIGS. 4B and 4C show light patterns that may be projected onto a scene.
Figure 4C:
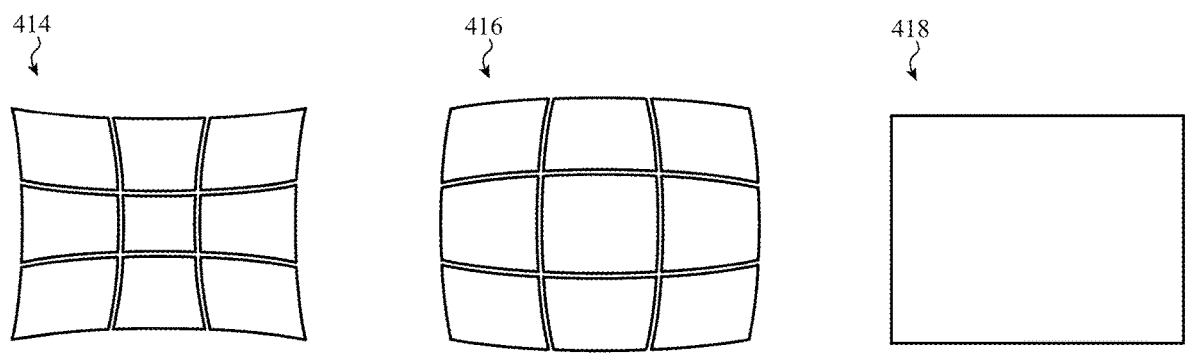

This distortion may be used to address image artifacts resulting from spacing between adjacent emitters of the emitter array. Specifically, the prisms may be configured to distort light produced by the emitter array (as directed to the prismatic surface 402 from a lens as discussed here) in order to cause partial overlap between the light emitted by adjacent emitters. For example, FIG. 4B shows a light pattern 412 that may be projected onto the prismatic surface 402 from a 3×3 array of emitters (the spacing between the individual segments of light are the result of the physical spacing between adjacent emitters in the array). If the housing 400 were not to include a prismatic surface 402 (or any other refractive features), this light pattern 412 would be passed on to the scene without appreciable change. With the prismatic surface 402, however, the outer faces of the prisms may collectively form a first radially distorted image 414 (which is distorted radially inward) and the inner faces of the prisms may collectively form a second radially distorted image 416 (which is distorted radially outward), such as shown in FIG. 4C. The prismatic surface 402 may project both the first radially distorted image 414 and the second radially distorted image 416 onto the scene through the transparent window. Because the gaps are distorted differently in the first radially distorted image 414 and the second radially distorted 416, when these images are overlaid the gaps may no longer be aligned between the two images. In this way, the prismatic surface 402 may fill the gaps that had been present in the input light pattern 412. Indeed, when all of the emitters are turned on, the prismatic surface 402 may surface may project an output image 418 of illumination that does not include gaps, such as shown in FIG. 4C.

In general, the prisms of the prismatic surface 412 preferably have sufficient optical power to create enough overlap between the first radially distorted image 414 and the second radially distorted image 416 to fill the gaps between adjacent emitters in the light pattern 412 received from the emitter array. As the optical power starts to increase (e.g., to the levels provided by typical Fresnel lenses), the distortions will start to cause light emitted from one emitter to overlap in the scene with light emitted from a second emitter. This may negatively impact the operation of the device, as this overlap may impair the adaptive light source module's ability to provide relatively uniform illumination to a scene. Accordingly, it may be desirable to configure the prismatic surface 402 to provide sufficient distortion to fill the gaps in a light pattern 412 received by the prismatic surface 402 (as discussed immediately above), but without creating significant overlap between illumination from adjacent emitters (for the purpose of this application, overlap between two emitters is considered to be "significant" if more than 10% of light emitted by a first of these emitters overlaps with the light emitted from a second of these emitters).

While choice of the first angle α of the inner face 408 and the second angle β of the outer face 410 of each prism 406 may be dependent on the design of (i) the emitter array (e.g., the relative spacing between adjacent emitters), (ii) the lens, and (iii) the overall tolerances of the adaptive light source module, the prismatic surfaces described herein are preferably configured such that the angles of the prism faces for at least one prism (and preferably all of the prisms) are each less than 16 degrees (i.e., the first angle α of the inner face 408 and the second angle β of the outer face 410 of a prism 406 are both less than 16 degrees). More preferably, the prismatic surface is configured such that the angles of the prism faces for at least one prism (and preferably all of the prisms) are each between 5 and 12 degrees (i.e., the first angle α of the inner face 408 of a prism 406 is between 5 and 12 degrees and the second angle β of the outer face 410 of the prism 406 is between 5 and 12 degrees).

Figure 5:
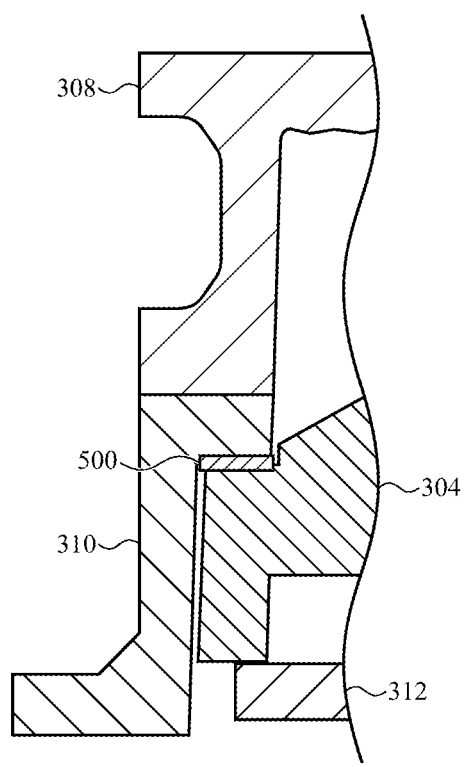
FIG. 5 shows a partial cross-sectional side view of a variation of a housing suitable for use with the adaptive light source modules described herein and comprising both a transparent portion and a non-transparent portion.

As mentioned above, one or more components of the housing may be configured to have one or more transparent portions as well as one or more non-transparent portions. For example, FIG. 5 shows a cross-section side view of variation of the adaptive light source module 300 described above with respect to FIG. 3 (similar components from adaptive light source module 300 will have the same labels as used in FIG. 3). Specifically, the housing may comprise a cap 306 that includes both a transparent portion (which includes transparent window 308) and a non-transparent portion 310. The transparent portion is configured to allow light from the emitter array (not shown) to leave the adaptive light source module (i.e., through transparent window 308) to illuminate a scene.

The non-transparent portion 310 may be opaque or translucent to visible light (and optionally to one or more non-visible wavelengths of light such as infrared or ultraviolet light), and may serve one or more functions. For example, in some variations the non-transparent portion 310 may act to visibly obscure one or more portions of the adaptive light source module from external observation. For example, in some instances where the cap 306 is configured to contact a top surface of lens 304 (such as described above with respect to FIG. 3), an adhesive 500 may be used to connect the cap 306 to the lens 304 as shown in FIG. 5. In these instances, uneven application of the adhesive 500 may be visible from outside the adaptive light source module with a fully transparent cap. The non-transparent portion 310 of the cap 306 may be positioned above adhesive 500 (e.g., so the adhesive 500 is positioned between the top surface of the lens 304 and the non-transparent portion 310 of the cap 306), which may limit visibility of the adhesive 500 through a top portion of the cap 306. Additionally or alternatively, the non-transparent portion may limit or prevent light from passing therethrough, which in turn may be used to reduce stray light that may exit the adaptive light source module into the overall device (which may interfere with other device components) and/or enter the adaptive light source module from the overall device (which may interfere with any light sensor positioned inside the adaptive light source module). Indeed, the adaptive light source module may be positioned at least partially within a device and configured such that visible light may only enter and exit the device through the transparent window 308. In these variations, a portion of the device housing (or another component within the device) may cover the sides of the transparent portion of cap 306 (and shield the covered portion of the transparent portion from light ingress), and the non-transparent portion 310 of cap 306 and substrate 312 may collectively block light from entering or leaving the remaining portion of the adaptive light source module that is positioned within the device.

When a cap 306 has both a transparent portion and a non-transparent portion, the cap 306 may be made in any suitable manner. For example, in some instances the cap 306 is formed using a two-shot injection molding process, where the transparent portion is molded from a first material and the non-transparent portion is molded from a second material. In other instances, the transparent portion of the cap 306 may be formed separately from and later connected to the non-transparent portion.

As mentioned above, the adaptive light source modules described herein may comprise a lens. Generally, the lens comprises an imaging region configured to focus, collimate, or otherwise shape light emitted by an emitter array (and direct the light to a scene through a portion of the housing). The lens may further comprise an attachment region configured to connect the lens to a portion of the housing, and may further comprise an intermediate region connecting the imaging region to the attachment region. In some instances, the intermediate region may be configured to direct light to an optional sensor, such as the light sensors described in more detail above.

Figure 6A:
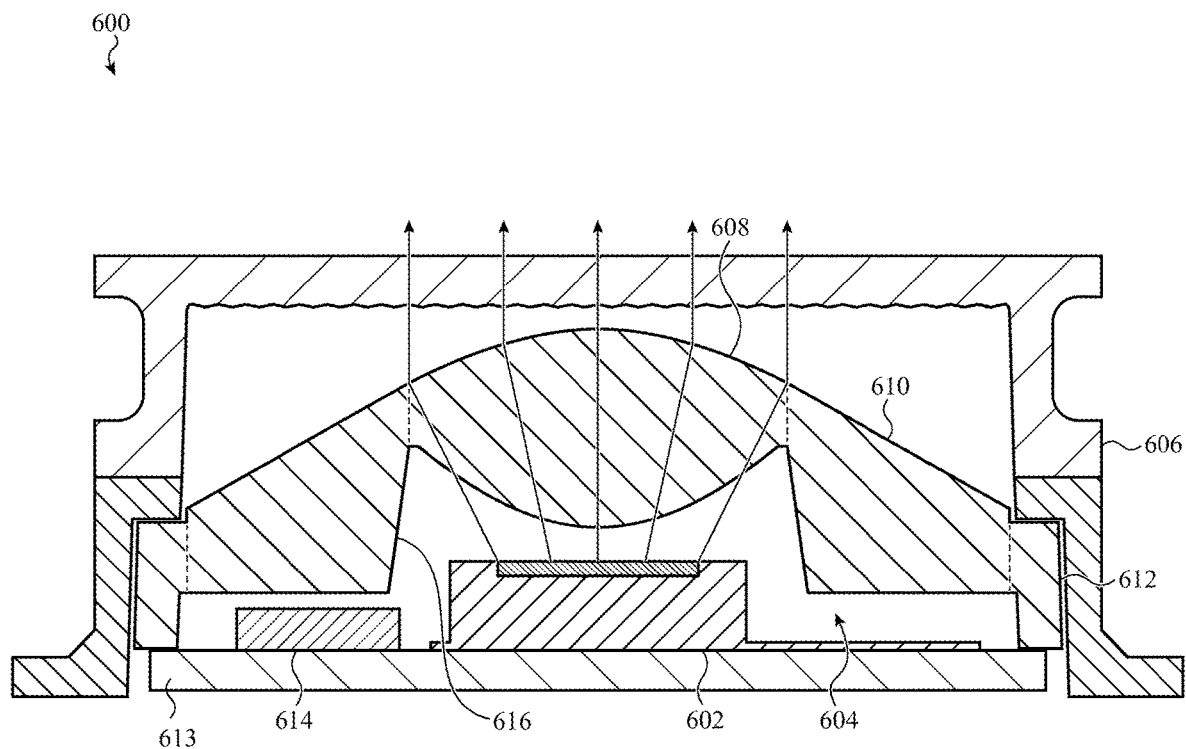
FIGS. 6A and 6B show cross-sectional side views of two variations of adaptive light source modules each comprising a lens.

For example, FIG. 6A shows a cross-sectional side view of one such variation of an adaptive light source module 600. As shown there, adaptive light source module 600 comprises an emitter array 602, a lens 604, and a cap 606, such as those described in more detail above. Lens 604 may comprise an imaging region 608, an intermediate region 610, and an attachment region 612. While discussed as being separate and distinct regions, it should be appreciated that the entire lens may be made from a single piece of material, and that the division between regions may be defined by changes in the cross-sectional profile of the lens 604. For example, the attachment region 612 may be the peripheral region of the lens 604, and may be a portion of the lens 604 that contacts one or more portions of the housing. For example, the attachment region 612 may be positioned in the adaptive light source module to contact the cap 606 (e.g., a top surface of the attachment region 612 may contact a bottom surface of the cap 606).

In the particular variation shown in FIG. 6A, the attachment region 612 is positioned with the adaptive light source module to contact both the cap 606 and a substrate 613 of the housing. Specifically the attachment region 612 comprises an annular segment with a top surface that contacts the cap 606 (either directly or indirectly via one or more intervening components such as a spacer) and a bottom surface that contacts the substrate (either directly or indirectly via one or more intervening components such as a spacer). While the attachment region 612 is shown in FIG. 6A as contacting both the cap and the substrate, it should be appreciated that an attachment region of a lens may contact only one of the cap or the substrate.

Figure 6B:
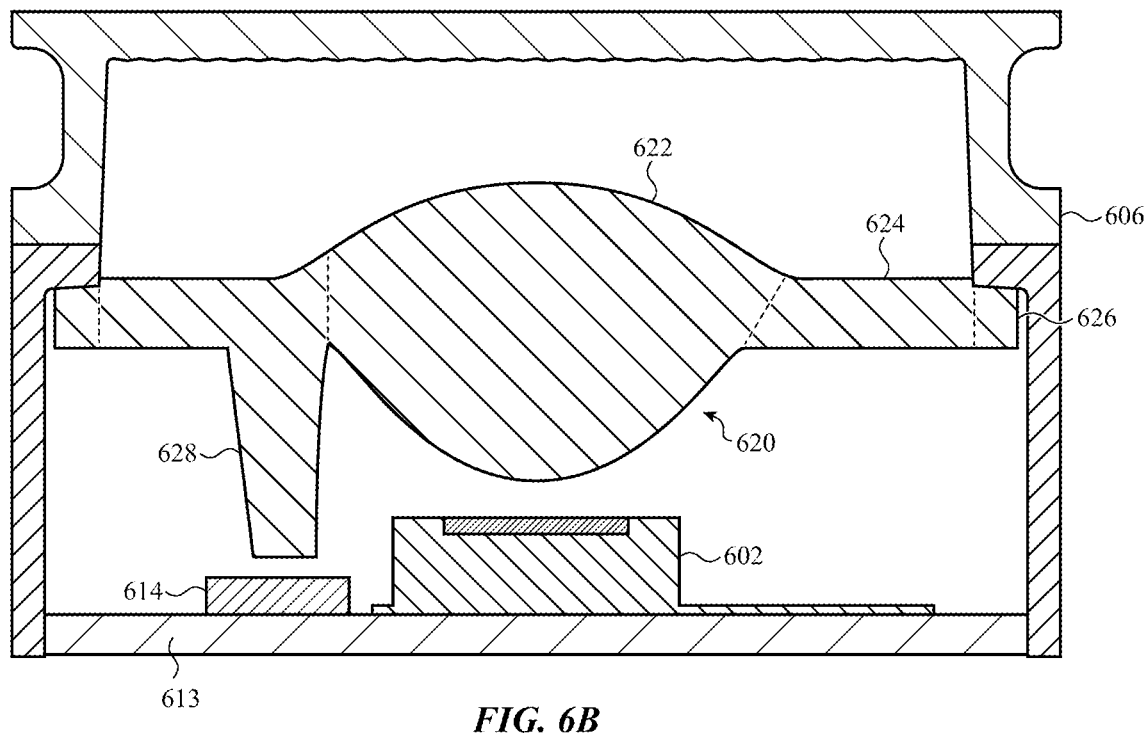

For example, FIG. 6B shows one such variation of an adaptive light source module 618. As shown there, the adaptive light source module 618 comprises an emitter array 602, a cap 606 (such as those shown in FIG. 6A), and a lens 620 having an imaging region 622, an intermediate region 624, and an attachment region 626. As shown there, the attachment region 626 is configured and positioned to contact the cap 606 (e.g., a top surface of the attachment region may contact a bottom surface of the cap 606) but not the substrate.

The imaging region of a lens (e.g., imaging region 608 of lens 604 and imaging region 622 of lens 620 from FIGS. 6A and 6B respectively) may be positioned over the emitter array 602, and is configured to focus, collimate, or otherwise shape the light emitted by the emitter array 602. The imaging region of the lens may, in conjunction with the size of the individual emitters, control how much of a given camera field of view each emitter will cover, such as mentioned above. The imaging region preferably comprises one or more curved surfaces to refract light (although it should be appreciated that a Fresnel lens may be utilized to achieve the same curved profile of the imaging region but with a reduced height). For example, the imaging region 608 shown in FIG. 6A and the imaging region 622 shown in FIG. 6B each comprise a convex front surface (i.e., facing away from the emitter array) and a convex rear surface (i.e., facing toward the emitter array) to form a biconvex lens, although it should be appreciated that other lens designs (e.g., a plano-convex or a meniscus lens) may be used in the imaging region as appropriate for the needs of a given adaptive light source module.

The intermediate region of the lens may be positioned between the imaging region and the attachment region of the lens, and typically does not image or otherwise direct light from the emitter array 602 onto the scene. For example, the intermediate region may block or otherwise prevent some light from the emitter array from reaching the transparent window. In the variation of lens 604 in FIG. 6A, the intermediate region 610 is shaped as an annular body having a front surface, a rear surface, and an inner sidewall 616 that extends from a rear surface of the imaging region 608 to the rear surface of the intermediate region 610. In some instances the front surface of the intermediate region 610 may be curved, which may or may not have the same radius of curvature as a front surface of the imaging region 608 (in embodiments where the imaging region 608 comprises a curved front surface).

In some instances, the inner sidewall 616 may be substantially vertically oriented (i.e., such that an acute angle between the inner sidewall 616 and the transparent window is at least 60 degrees), which in turn causes light reaching the inner sidewall 616 to be refracted away from the transparent window (it should also be appreciated that in some instances the inner sidewall 616 may include an absorptive coating which may absorb light received by the inner sidewall 616). For example, in some instances the inner sidewall 616 has a cylindrical shape (e.g., that may be oriented perpendicular to the transparent window), while in other instances the inner sidewall 616 has a frustoconical shape (e.g., which may be oriented such that axis of the cone is perpendicular to the transparent window and the inner sidewall 616 narrows in a direction from the emitter array 602 to the transparent window). In some instances, the inner sidewall 616 may encircle a portion of the imaging region 608 (e.g., encircle the convex rear surface of the imaging region 608 as shown in FIG. 6A). Additionally or alternatively, the inner sidewall 616 may encircle at least a portion of the emitter array 602. In these variations, any light emitted from (or reflected off of) the emitter array 602 will initially interact with either the imaging region 608 or the inner sidewall 616, thereby allowing the lens 604 to control all of the light coming from the emitter array 602.

In variations of adaptive light source modules that comprise a light sensor (e.g., sensor 614 shown in FIGS. 6A and 6B), the intermediate region may be configured to direct light to the sensor 614. Specifically, in order to measure characteristics of light present in a scene, the intermediate region may receive scene light through the transparent window and may focus or otherwise direct light onto the sensor 614. The design of the intermediate region may control the spatial extent of the scene from which the sensor 614 may receive light. In other words, adjustments to the intermediate region may allow the sensor 614 to collect light from a larger portion of the scene, which may allow the sensor 614 to better characterize the overall scene. For example, in some instances a rear surface of intermediate region 610 may extend past a top surface of the emitter array, which may place the rear surface of the intermediate region in close proximity to the sensor 614. As an example of this, the inner sidewall 616 shown in FIG. 6A at least partially encircles the emitter array 602 so that a rear surface of the intermediate region 610 extends past a top surface of the emitter array 602. In other words, the rear surface of the intermediate region 610 may be closer to a back end of the adaptive light source module (e.g., closer to a substrate 613 that supports the sensor 614 and the emitter array 602) relative to a top surface of the emitter array 602.

While the intermediate region 610 of lens 604 shown in FIG. 6A is shown as being axially symmetric (which may be advantageous for manufacturing), it should be appreciated that in some instance the intermediate region 610 may not be axially symmetric. For example, in the variation of lens 620 shown in FIG. 6B, the intermediate region 624 is not radially symmetric. In this particular example, the intermediate region 624 comprises a protrusion 628 that extends away from a front surface of the intermediate region. This protrusion 628 may be positioned at least partially over the sensor 614, and may act as a light pipe to direct scene light to the sensor 614.

Figure 9:
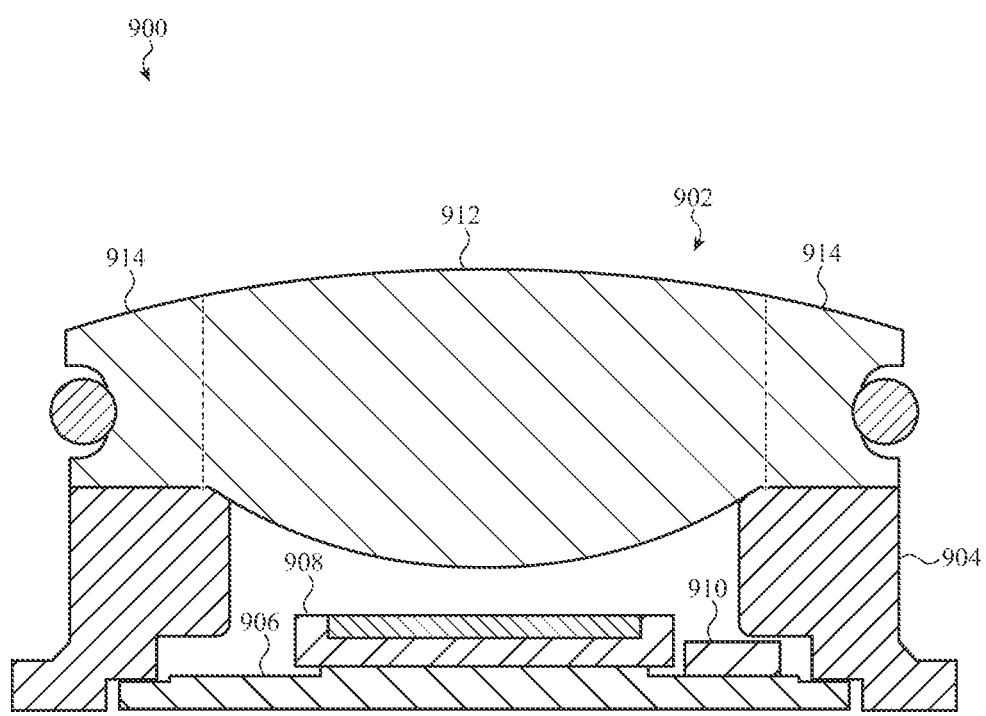
FIG. 9 shows a cross-sectional side view of a variation of an adaptive light source module including a lens.

In some variations of the adaptive light source modules described herein, the adaptive light source includes a lens that forms a portion of the housing of the adaptive light source unit. For example, FIG. 9 shows one such variation of an adaptive light source module 900. As shown there, the light sources unit 900 includes a lens 902, a standoff 904, a substrate 906, an emitter array 908. The lens 902, the standoff 904, and the substrate 906 may collectively form a housing of the adaptive light source module 900.

Specifically, the substrate 906 (which may be configured in any manner as described above) may support the emitter array 908 to hold the emitter array 908 within the housing. In variations where the adaptive light source module 900 comprises a sensor (such as sensor 910 shown in FIG. 9, which may be configured in any manner as described above), the substrate 906 may further support the sensor 910. The standoff 904 is a segment of the housing that holds the lens 902 relative to the substrate 906, which may set the relative position between the lens 902 and the emitter array 908. The standoff 904 defines an opening extending therethrough to allow light emitted by the emitter array 908 to reach the lens 902. While the standoff 904 and substrate 906 are shown in FIG. 9 as being formed from two separate components, it should be appreciated that in other instances these two components may be formed as a single piece of housing. In still other variations, the adaptive light source module 900 does not include a standoff 904 and the lens 902 directly connects to the substrate 906.

In some variations, an adhesive (not shown) may be used to connect the lens 902 to the standoff 904. Accordingly, it may be desirable to form at least a portion of the standoff from a non-transparent material, which may limit the visibility of uneven adhesive application that may otherwise be visible from outside the adaptive light source module with a fully transparent cap. In some variations, at least a portion of the standoff 904 may be formed from a transparent material. For example, a transparent portion of the standoff 904 may be positioned at least partially over a sensor 910. The transparent portion of the standoff 904 may receive scene light via the lens 902 and may act as a light pipe to direct this scene light to the sensor 910.

As with the lenses of the adaptive light source modules described above with respect to FIGS. 6A and 6B, the lens 902 includes an imaging region 912 configured to focus, collimate, or otherwise shape light emitted by the emitter array 908 as discussed in more detail above. While the lens 902 is shown in FIG. 9 as including a convex front surface (i.e., facing away from the emitter array and that also forms an outer surface of the housing of the adaptive light source module 900) and a convex rear surface (i.e., facing toward the emitter array) that form a biconvex lens, it should be appreciated that other lens designs (e.g., a plano-convex or a meniscus lens) may be used in the imaging region as appropriate for the needs of a given adaptive light source module. The lens 904 further includes an attachment region 914 configured to connect the lens 902 to the rest of the housing. For example, in the variation shown in FIG. 9, a bottom surface of the attachment region 914 is positioned to contact a top surface of the standoff 904 (either directly or indirectly via one or more intervening components such as a spacer). While not shown in FIG. 9, the lens may further include an intermediate segment connecting the attachment region 914 to the imaging region 912. In these instances, the intermediate region may be configured in any manner as described above (e.g., to direct light to a sensor 910).

Figure 7A:
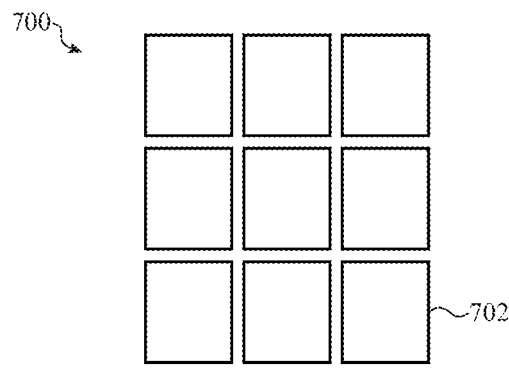
FIGS. 7A-7C show variations of emitter arrays suitable for use with the adaptive light source modules described here.

The adaptive light source modules described herein may be used with a wide range of different emitter array configurations. Specifically, the relative dimensions and positioning of individual emitters may be selected depending on the intended use cases and system constraints (e.g., available power, maximum light source module size). In some instances it may be desirable to have an emitter array in which each emitter has the same dimensions. For example, FIG. 7A shows an emitter array 700 that comprises a plurality of individual emitters 702 each having the same dimensions. While shown in FIG. 7A as a 3×3 array, it should be appreciated that the emitter array 700 may comprise any suitable number and arrangement of emitters, such as, for example, a 2×3 array, a 2×4 array, a 3×4 array, a 4×4 array of the like.

Figure 7B:
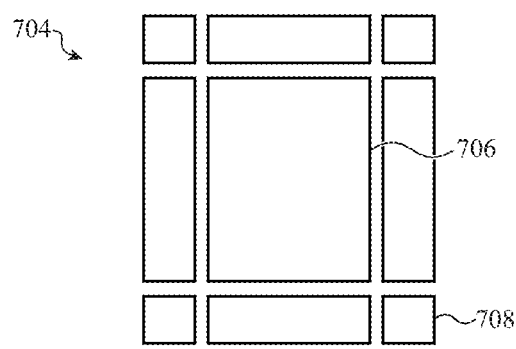

In other variations, it may be desirable to have some emitters in an array be larger than other emitters in the array. In some of these variations, a central emitter (or each emitter from a group of central emitters) may be larger than each of a plurality of peripheral emitters. For example, FIG. 7B shows one such variation of an emitter array 704. As shown there, the emitter array 704 may be a 3×3 array of emitters comprising a central emitter 706 and a plurality of peripheral emitters 708 (e.g., the remaining eight emitters of the 3×3 array) that surround the central emitter 706. In this variation, the central emitter 706 may be larger than each of the peripheral emitters 708, such that the central emitter 706 is the largest emitter in the emitter array 704.

Emitter array 704 may find particular utility in instances where the adaptive light source module is used in conjunction with a multi-camera system (such as multi-camera system 102 described above with respect to FIGS. 1A-1C). For example, the central emitter 706 may be sized and positioned within an adaptive light source module such that when the central emitter 706 emits light, that light fills a field of view of one camera in the multi-camera system (e.g., the light may fill field of view 116 of the third camera 108 of the multi-camera system 102). This may allow a single emitter (i.e., the central emitter 706) from the emitter array 704 to be activated to fully illuminate this field of view. Especially in instances where there is a limit to how much system current is available to drive the individual emitters, this may help maximize the illumination that may be provided to this field of view. It should be appreciated that when an emitter is used to direct light to a scene, the size and shape of the light that reaches the scene is dependent on at least the size and shape of the emitter, the design and relative position of the lens, and the design and relative position of the transparent window.

The central emitter 706 may further be sized and positioned within the adaptive light source module such that light emitted from the central emitter 706 does not fill a field of view or one or more additional cameras of the multi-camera system (e.g., the field of view 114 of the second camera 106 and the field of view 112 of the first camera 104 of the multi-camera system 102). In these instances, additional emitters (i.e., the peripheral emitters 708) from the emitter array may be activated to assist in illuminating these fields of view. An example of this may be described above with respect to FIGS. 8A and 8B below.

Figure 7C:
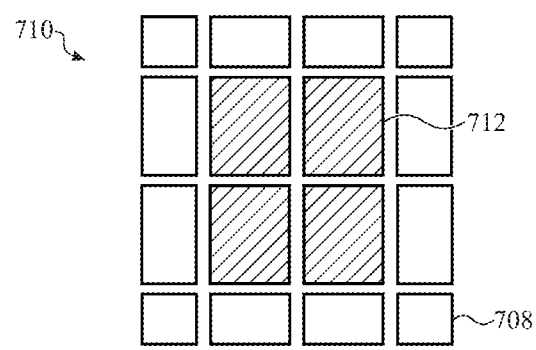

While emitter array 704 is shown in FIG. 7B as having a single central emitter 706, in other instances an emitter array may comprise a group of central emitters, each of which are larger than a plurality of peripheral emitters. For example, FIG. 7C shows one such example of an emitter array 710. As shown there, emitter array 710 may comprise a first group of central emitters 712 and a second group of peripheral emitters 708 surrounding the first group. Each of the central emitters 712 may be larger than each of the peripheral emitters 708. The first group of central emitters 712 may collectively emit light that fills a field of view of a camera of a multi-camera system (e.g., the light may fill field of view 116 of the third camera 108 of the multi-camera system 102). While this may not be able to yield as much total illumination as a single emitter (e.g., central emitter 706 from the emitter array 704 shown in FIG. 7B) due to the gaps between the individual central emitters 712, this may allow for flexibility to adjust illumination within the field of view by selectively adjusting the illumination provided by different individual emitters from the first group of central emitters 712. As with the discussion of FIG. 7B, the peripheral emitters 708 may be used to assist in illuminating the fields of view of other cameras of a multi-camera system (e.g., the field of view 114 of the second camera 106 and the field of view 112 of the first camera 104 of the multi-camera system 102).

The adaptive light source modules may be configured such that each emitter of the emitter array is individually addressable, such that the light emitted by each emitter may be individually controlled. In some instances, it may be desirable to control certain emitters as groups. While this may come at the cost of flexibility in spatially varying the illumination provided by the adaptive light source module, it may simplify the driver design by reducing the number of control signals that the driver needs to output.

Figure 8A:
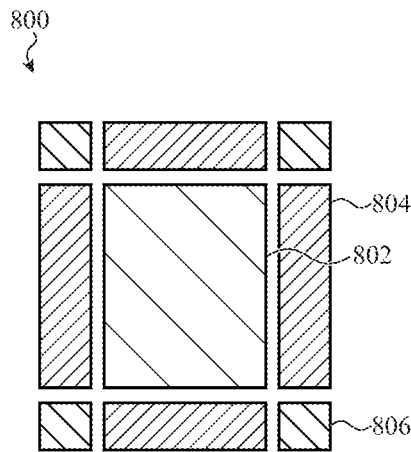
FIG. 8A shows a variation of an emitter array in which some emitters of the emitter array may be controlled as a group.
Figure 8B:
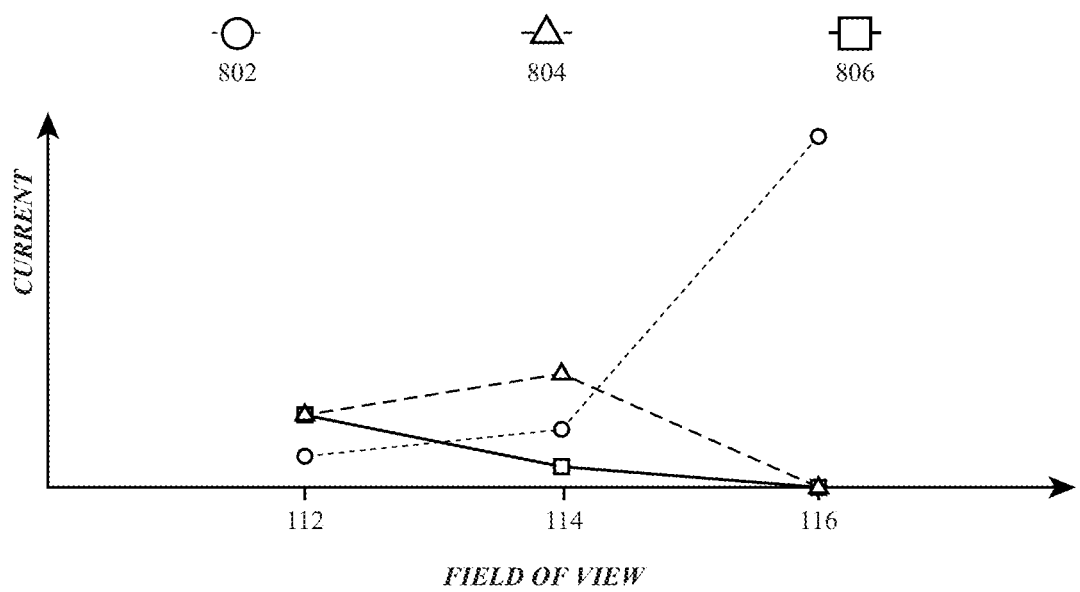
FIG. 8B shows different exemplary modes for driving the emitter array of FIG. 8A.

For example, FIGS. 8A and 8B show an example of an emitter array 800 in which some emitters may be controlled as a group. As shown there, the emitter array 800 may comprise a 3×3 emitter array (though the array may be include any suitable number and arrangement of emitters such as discussed above) comprising a central emitter 802 and a plurality of peripheral emitters (e.g., the remaining eight emitters) that surround the central emitter 802, similar to emitter array 704 described above with respect to FIG. 7B. The peripheral emitters may be divided into a first emitter group 804 (e.g., a plurality of emitters immediately adjacent to the sides of the central emitter 802) and a second emitter group 806 (e.g., a plurality of emitters positioned in the corners of the emitter array 800). The emitters of the first emitter group 804 may be controlled together (e.g., may receive the same current from a driver of the adaptive light source module) and the emitters of the second emitter group 806 may also be controlled together. Accordingly, the emitter array 800 may be controlled to emit light using three different control signals, one control signal to control the central emitter 802, a second control signal to control the first emitter group 804, and a third control signal to control the second emitter group 806.

The emitter array 800, when incorporated into an adaptive light source module, may be used to selectively illuminate different fields of view in a scene. This may be useful when one or more cameras are used to capture images of these different fields of view. For example, the device may be configured to select a target field of view (e.g., which may be determined automatically by the device or set using a user input). The device may then be configured to select a desired illumination profile based at least in part on the determined target field of view (and typically based at least in part on scene content and conditions). The adaptive light source module may be illuminate the scene according to the selected illumination profile, and the one or more cameras may be used to capture one or more images during this illumination. These one or more images may be captured at a field of view corresponding to the target field of view. For example, one camera of a multi-camera system may be selected to capture an image during this illumination, and the target field of view may be selected to match a field of view of the camera. In other instances, a camera may be directed to capture an image having a smaller field of view than that camera's field of view (which can be accomplished by cropping an image captured by the camera), and the target field of view may be selected to match this smaller field of view.

When the target field of view changes, the selection of emitters that will be activated (as well as the relative current provided to the active emitters) may be changed to set a new illumination profile. For example, FIG. 8B shows a graph depicting different modes of controlling the emitter array 800 of an adaptive light source module when illuminating the fields of view associated with the multi-camera system 102 described above with respect to FIGS. 1A-1C. In a one mode, the adaptive light source module is used to illuminate the third field of view 116 (i.e., the field of view of the third camera 108 of the multi-camera system 102, which in this instance is the narrowest of the three fields of view). In the first mode, current is driven to only the central emitter 802 (which may be sized to fill the field of view 116 as discussed above with respect to FIG. 7B).

When moving to a larger field of view, the adaptive light source module may operate in a second mode to illuminate the second field of view 114 (i.e., the field of view of the second camera 106 of the multi-camera system 102), which is larger than the third field of view 116). In this mode, each of the central emitter 802, the first emitter group 804, and the second emitter group 806 may be activated to at least partially fill the second field of view 114 (though it should be appreciated that some of this illumination may also extend beyond the second field of view 114). The relative current amounts may be selected to achieve a predetermined illumination brightness and uniformity for the second field of view 114. For example, in this mode, each emitter of the first emitter group 804 may receive more current than the central emitter 802, which in turn may receive more current than each of the emitters of the second emitter group 806.

Finally, when moving to the widest field of view, the adaptive light source may operate in a third mode to illuminate the third field of view 112 (i.e., the field of view of the first camera 104 of the multi-camera system 102). Like the second mode, each of the central emitter 802, the first emitter group 804, and the second emitter group 806 may be activated to at least partially fill the second field of view, however the relative current applied to each group may achieve a different predetermined illumination brightness and uniformity selected for the first field of view 112. For example, in this mode, each emitter from both the first emitter group 804 and the second emitter group 806 may receive more current than the central emitter 802. It should be appreciated, however, within a mode, that the relative current distributions between the central emitter 802, the first emitter group 804, and the second emitter group 806 may be adjusted to change the balance between brightness and uniformity for that mode.

In the adaptive light source modules described herein, each emitter or group of emitters is controlled to provide a corresponding target illumination intensity to a scene, which collectively controls the overall light intensity delivered to the scene. In practice, there may be device-to-device variations, such as those caused by manufacturing tolerances, that may impact how a particular unit will illuminate the scene. For example, a slight shift between a lens and an emitter array of an adaptive light source module may change the uniformity of illumination provided by the emitter array. Accordingly, the adaptive light source module may be calibrated such that each emitter or group of emitters has a corresponding set of drive settings. Each drive setting corresponds to a current level to be applied to an individual emitter or groups of emitters in order to provide a target scene intensity.

When the adaptive light source module is used to provide a target scene illumination, a driver of the adaptive light source module may identify a target scene intensity to be provided by each emitter or group of emitters of the emitter array. The driver may then drive each emitter or group of emitters accordingly, using the specific drive setting for the target scene intensity to set a corresponding drive current for that emitter or group of emitters. Accordingly, though the drive settings (and corresponding drive currents) may vary from unit to unit, the adaptive light source modules may provide consistent illumination across units.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A light source module comprising:
a housing comprising a transparent window;
an emitter array positioned and configured to emit light through the transparent window; and
a lens, wherein:
the lens is positioned between the transparent window and the emitter array and comprises an imaging region positioned over the emitter array;
the transparent window comprises a prismatic surface having a plurality of concentric prisms positioned around a center point;
each concentric prism of the plurality of concentric prisms has an inner face that is angled toward the center point at a first angle and an outer face that is angled away from the center point at a second angle; and
the first angle and second angle for each concentric prism of the plurality of concentric prisms are each less than 16 degrees.

2. The light source module of claim 1, wherein the first angle and second angle for each concentric prism of the plurality of concentric prisms are each between 5 and 12 degrees.

3. The light source module of claim 1, wherein the housing comprises a substrate and a cap, wherein the emitter array is supported by the substrate.

4. The light source module of claim 1 wherein the lens comprises an attachment region connected to a portion of the housing and an intermediate region between the imaging region and the attachment region.

5. The light source module of claim 3, wherein an attachment region of the lens is configured and positioned within the housing such that the cap contacts a top surface of the attachment region and the substrate contacts a bottom surface of the attachment region.

6. The light source module of claim 4 wherein the intermediate region is shaped as an annular body having an inner sidewall, and wherein the inner sidewall encircles at least a portion of the imaging region.

7. The light source module of claim 4 further comprising a light sensor, where at least a portion of the intermediate region is positioned above the light sensor.

8. The light source module of claim 4, wherein the emitter array is supported by a substrate and a rear surface of the intermediate region is closer to the substrate than a top surface of the emitter array.

9. A system comprising:
a light source module comprising:
a housing comprising a transparent window;
an emitter array positioned and configured to emit light through the transparent window; and
a lens, wherein the lens is positioned between the transparent window and the emitter array,
wherein:
at least one central emitter of the emitter array is larger than at least one peripheral emitter of the emitter array;
the transparent window comprises a prismatic surface having a plurality of concentric prisms positioned around a center point;
each concentric prism of the plurality of concentric prisms has an inner face that is angled toward the center point at a first angle and an outer face that is angled away from the center point at a second angle; and
the first angle and second angle for each concentric prism of the plurality of concentric prisms are each less than 16 degrees.

10. The system of claim 9 further comprising a first camera having a first field of view, wherein the light source module is configured such that light generated by the at least one central emitter fills the first field of view.

11. The system of claim 9 wherein the at least one central emitter comprises a plurality of central emitters and the at least one peripheral emitter comprises a plurality of peripheral emitters that surround the plurality of central emitters.

12. The system of claim 10 wherein the at least one central emitter comprises a first central emitter, and wherein the light source module is further configured such that light emitted by the first central emitter fills the first field of view.

13. The system of claim 10 wherein the at least one central emitter comprises a plurality of central emitters, and wherein the light source module is further configured such that light collectively emitted by the plurality of central emitters fills the first field of view.

* * * * *